US008167643B2

(12) United States Patent
Yoshida et al.

(10) Patent No.: US 8,167,643 B2
(45) Date of Patent: May 1, 2012

(54) CARD CONNECTOR

(75) Inventors: Satoru Yoshida, Kawaguchi (JP);
Yoshiharu Ishii, Kawasaki (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/002,142

(22) PCT Filed: Jun. 25, 2009

(86) PCT No.: PCT/JP2009/061663
§ 371 (c)(1),
(2), (4) Date: Dec. 30, 2010

(87) PCT Pub. No.: WO2010/001816
PCT Pub. Date: Jan. 7, 2010

(65) Prior Publication Data
US 2011/0130029 A1 Jun. 2, 2011

(30) Foreign Application Priority Data
Jul. 1, 2008 (JP) .................................. 2008-172552

(51) Int. Cl.
*H01R 13/00* (2006.01)
(52) U.S. Cl. ...................................................... 439/485
(58) Field of Classification Search .................. 439/487, 439/630, 485, 76.1
See application file for complete search history.

(56) References Cited

U.S. PATENT DOCUMENTS

| 6,447,303 B1 * | 9/2002 | Kihira et al. ................... 439/63 |
| 2002/0081910 A1 | 6/2002 | Kihira et al. |
| 2007/0070446 A1 | 3/2007 | Chen |

FOREIGN PATENT DOCUMENTS

| JP | 2002-198107 | 7/2002 |
| JP | 2005-322498 | 11/2005 |
| JP | 2007-97108 | 4/2007 |

OTHER PUBLICATIONS

English-language International Search Report from the Japanese Patent Office in International Application No. PCT/JP2009/061663 mailed Jul. 8, 2009.

\* cited by examiner

*Primary Examiner* — Javaid Nasri
(74) *Attorney, Agent, or Firm* — Finnegan, Henderson, Farabow, Garrett & Dunner, LLP (57) ABSTRACT

The card connector in which a card receiving space for containing at least a part of a small card incorporating an integrated circuit is formed by a cover member having at least a top board and right and left side walls and a base member having at least a bottom wall, a front wall, and right and left side walls, the card connector includes: a plurality of contacts penetrating the front wall of the base member and being elastically deformably supported by the base member; and a heat dissipating mechanism located behind the plurality of contacts and elastically deformably supported by the base member. The heat dissipating mechanism includes at least one heat dissipating piece having a free end at one end. The heat dissipating mechanism is disposed at a cutoff portion formed at the bottom wall of the base member.

5 Claims, 9 Drawing Sheets

CARD CONNECTOR

CROSS-REFERENCE TO RELATED APPLICATIONS

This application is the National Phase filing of PCT Application No. JP2009/061663, filed Jun. 25, 2009, which claims the benefit of priority from Japanese Patent Application No. 2008-172552, filed on Jul. 1, 2008; the entire contents of which are incorporated herein by reference.

TECHNICAL FIELD

The present invention relates to a card connector, and more specifically to a card connector including a card heat dissipating mechanism.

BACKGROUND ART

In recent years, card connectors for electronic devices such as a cellular telephone have been known, in which a memory card, a function expansion card or any other similar card (hereinafter simply referred to as an "IC card") incorporating an integrated circuit is inserted in order to electrically connect the IC card to the electronic device. The card connectors are facing demands for a smaller size and a thinner profile as well as demands for higher speed transmission of signals between the electronic device and the IC card and for a larger capacity of a memory. Power consumption is increased as a result of the higher speed transmission and the larger capacity of the memory. Accordingly, the IC card itself generates heat, thereby causing expansion, deformation or damage of the IC card itself which is formed by molding, electrical connection failures between external contact points of the IC card and contacts of the card connector. For this reason, as disclosed in Patent Literature 1, there is known a card heat dissipating mechanism designed for absorbing heat generated from an IC card. The mechanism is configured to cause a heatsink to contact an IC card being attached to a card connector to dissipate the heat from the IC card and thereby to maintain the IC card at a predetermined temperature or below.

Citation List

Patent Literature
PTL 1: Japanese Patent Laid-Open No. 2005-322498

SUMMARY OF INVENTION

Technical Problems

As disclosed in PTL 1, a conventional card heat dissipating mechanism causes a heatsink to contact a memory card from above the card either after insertion or along with insertion of the card. In consideration of a dissipation characteristic of the above-described dissipating mechanism, the card dissipating mechanism has to be large in size to some extent. Meanwhile, provided with the heatsink configured to contact closely to the IC card or to contact to the IC card along with insertion of the IC card, the card heat dissipating mechanism has a complicated structure.

This complicates manufacturing of the card connector and increases manufacturing costs as well. Moreover, the existence of the card dissipating mechanism brings limitations on size and profile reduction even if the IC card itself is reduced in size and profile.

In view of the foregoing problems, an object of the present invention is to provide a card connector provided with a heat dissipating mechanism which has a simple structure yet achieves a high heat dissipation effect without hindering size and profile reduction of the card connector.

Solution to Problems

To achieve the above object, a card connector according to the present invention is a card connector in which a card receiving space for receiving at least a part of a small card incorporating an integrated circuit is formed by a cover member having at least a top board and right and left side walls and a base member having at least a bottom wall, a front wall, and right and left side walls, the card connector including: a plurality of contacts passing through the front wall of the base member and being elastically deformably supported by the base member; and a heat dissipating mechanism located behind the plurality of contacts and elastically deformably supported by the base member. The heat dissipating mechanism includes at least one heat dissipating piece having a free end at one end. The heat dissipating mechanism is disposed at a cutoff portion formed at the bottom wall of the base member.

Furthermore, in the card connector according to the present invention, the heat dissipating mechanism may include at least one heat dissipating piece extending in an anteroposterior direction and having a front heat dissipating piece having a free end at a front end portion, a bent portion continuous with the front heat dissipating piece, and a rear heat dissipating piece continuous with the bent portion and having a rear end portion supported by the base member. The heat dissipating mechanism may have a cross section of an angle shape protruding upward, and the bent portion of the heat dissipating piece may be disposed inside the card receiving space when the small card is not inserted.

Still furthermore, in the card connector according to the present invention, the heat dissipating mechanism may include an elongated and flat support member extending in a right-to-left direction, a front heat dissipating piece extending in an anteroposterior direction and having a free end at one end and another end coupled with the support member, and a rear heat dissipating piece extending in the anteroposterior direction and having a free end at one end and another end coupled with the support member. The heat dissipating mechanism may have a cross section of a trapezoidal shape and may be vertically movably supported at both end portions of the support member with respect to the base member, and the support member may be disposed inside the card receiving space when the small card is not inserted.

ADVANTAGEOUS EFFECTS OF INVENTION

In the present invention, a heat dissipating mechanism is elastically deformably disposed at a cutoff portion formed on a base member of a card connector. Hence size or profile reduction of the card connector is not be hindered. Moreover, the present invention utilizes a printed board having a large heat capacity as well as an electronic device that attaches the printed board, and is configured such that the heat dissipating mechanism is elastically deformable. Accordingly, contact between a small card to be inserted and the heat dissipating mechanism and contact between the heat dissipating mechanism and the printed board is assured whereby heat dissipation efficiency is improved.

Moreover, by making the heat dissipating mechanism out of a thin metal plate and forming a cross section thereof into an angle shape or a trapezoidal shape, it is possible to achieve elastic deformation of the heat dissipating mechanism with a simple structure and to manufacture the connector easily.

DESCRIPTION OF EMBODIMENTS

Now, some examples of a card connector for small card according to the present invention will be described below by using drawings.

EXAMPLE 1

Figure 1:
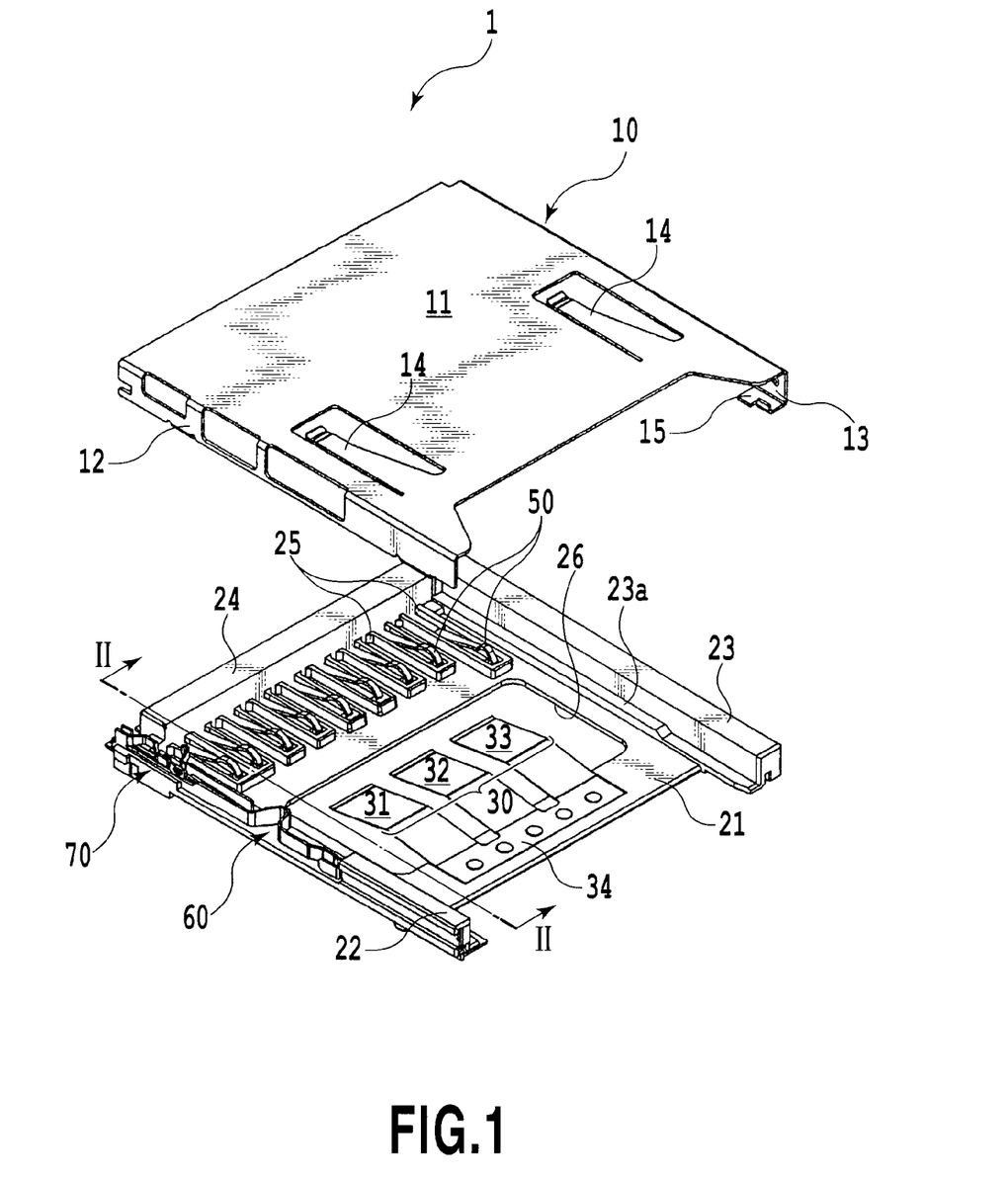
FIG. 1 is an assembly exploded perspective view of a card connector for small card according to Example 1 of the present invention.
Figure 2A:
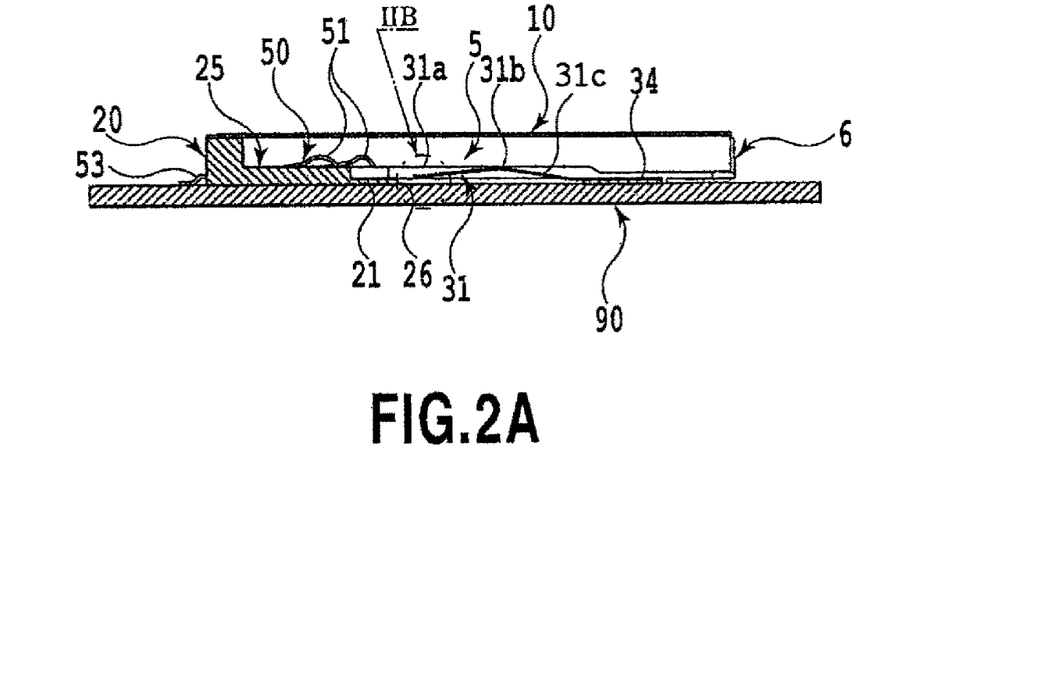
FIG. 2A is a schematic cross-sectional view of the card connector for small card of FIG. 1 being fitted onto a printed board of an electronic device, which is taken along a II-II line and shows a state where an IC card is not inserted.
Figure 2B:
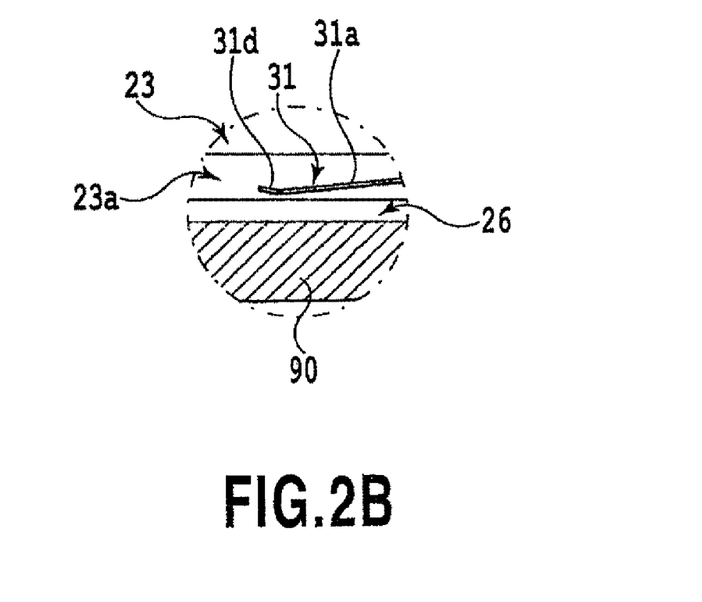
FIG. 2B is a partially enlarged cross-sectional view of a portion IIB in FIG. 2A.
Figure 3A:
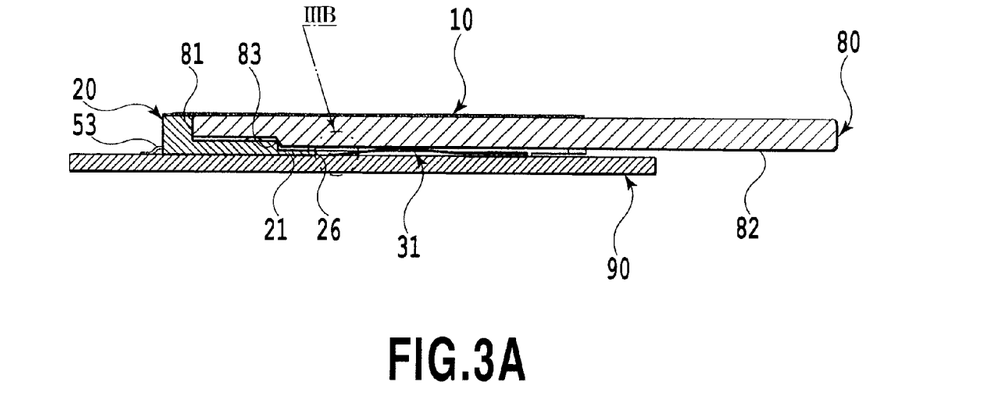
FIG. 3A is a schematic cross-sectional view of the card connector for small card of FIG. 1 as similar to FIG. 2A, which shows a state where the IC card is inserted.
Figure 3B:
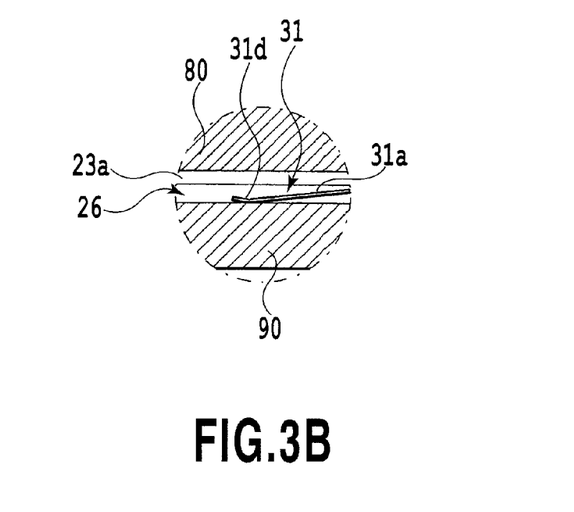
FIG. 3B is a partially enlarged cross-sectional view of a portion IIIB in FIG. 3A.
Figure 4A:
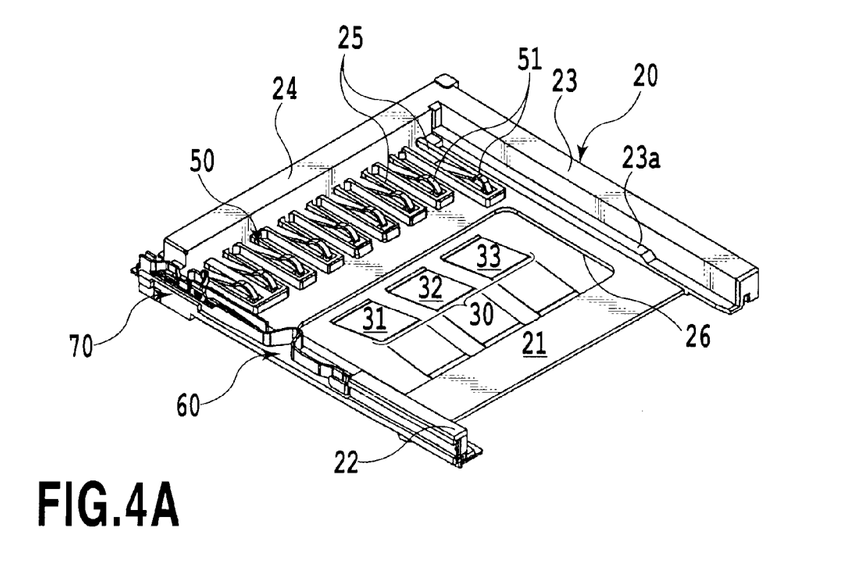
FIG. 4A is a perspective view of a modified example of the card connector for small card according to Example 1 of the present invention, which shows the connector in a state where a cover member is detached therefrom.
Figure 4B:
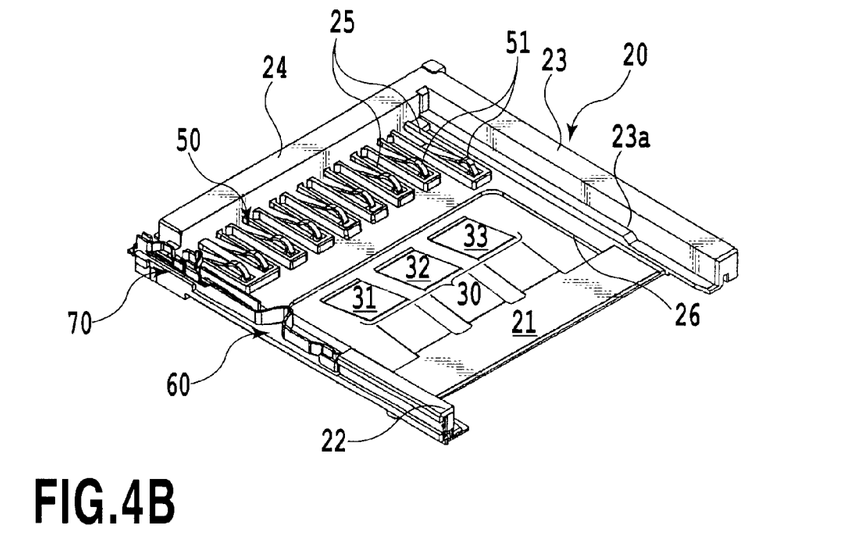
FIG. 4B is a perspective view of another modified example of the card connector for small card according to Example 1 of the present invention, which shows the connector in a state where a cover member is detached therefrom.
Figure 9:
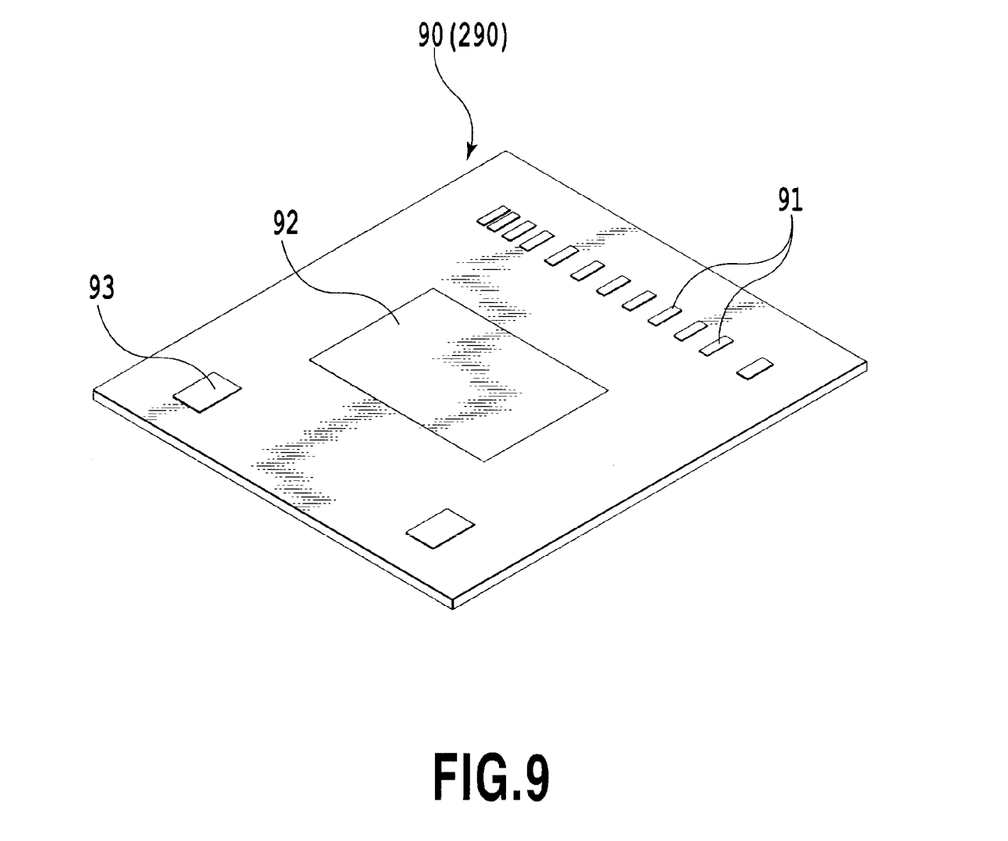
FIG. 9 is a perspective view of a printed board to which the card connector for small card according to the present invention is attached.

FIG. 1 is an exploded perspective view of a card connector for small card according to Example 1 of the present invention. FIG. 2A is a schematic cross-sectional view of the card connector for small card of FIG. 1 being fitted onto a printed board of an electronic device or the like, which is taken along a II-II line and shows a state where an IC card is not inserted. FIG. 2B is a partially enlarged cross-sectional view of FIG. 2A. FIG. 3A is a schematic cross-sectional view of the card connector for small card of FIG. 1 as similar to FIG. 2A, which shows a state where the IC card is inserted. FIG. 3B is a partially enlarged cross-sectional view of FIG. 3A as similar to FIG. 2B. FIG. 4A is a perspective view of a modified example of the card connector for small card according to Example 1 of the present invention, which shows the connector in a state where a cover member is detached therefrom. FIG. 4B is a perspective view of another modified example of the card connector for small card according to Example 1 of the present invention, which shows the card connector in the state where the cover member is detached therefrom as similar to FIG. 4A. FIG. 9 is a perspective view of a printed board to which the card connector for small card according to the present invention is attached.

As shown in FIGS. 2A to 3B, a card connector 1 (hereinafter simply referred to as the "connector") according to Example 1 of the present invention is fixed by soldering onto a printed board 90 attached to an electronic device as similar to the conventional card connector disclosed in PTL 1. The card connector 1 according to this example connects a small IC card 80, which has been subjected to downsizing and thin profiling, electrically to the printed board 90.

The card connector 1 according to this example essentially includes a cover member 10, a base member 20, a heat dissipating mechanism 30, and a plurality of contacts 50.

The cover member 10 is formed of a metal thin plate by press work and defines a card receiving space 5 for receiving at least part of the IC card 80 by being assembled with the base member 20 so as to be vertically stacked on each other (see FIG. 2A). The IC card 80 is inserted from a card insertion slot 6 formed at the back of the card receiving space 5 forward into the card receiving space 5.

In this example, the cover member 10 is provided with a top board 11, and a right and left pair of side walls 12 and 13, and is formed so as to cover the base member 20. Reference numeral 14 denotes a pair of brake pieces provided so as to prevent the IC card 80 from falling off the connector 1, and reference numeral 15 denotes a pair of fixing pieces provided so as to fix the assembled connector 1 to fixing pads 93 (see FIG. 9) on the printed board 90 by soldering. Here, the cover member 10 may also be provided with a front wall for covering a front wall 24 of the base member 20 at least partially.

The base member 20 is formed by use of insulative synthetic resin. In this example, the base member 20 includes a bottom wall 21, a right and left pair of side walls 22 and 23, and the front wall 24.

A plurality of elongated grooves 25 are formed on the front side of the bottom wall 21 of the base member 20 in order to press-fit and fix each of the plurality of contacts 50 to the base member 20. In this example, as shown in FIG. 1, each of the plurality of elongated grooves 25 is formed by surrounding four sides with walls (the front wall 24 of the base member 20 serves as one of the walls). Moreover, the plurality of elongated grooves 25 extend in an anteroposterior direction or a card insertion direction and are formed parallel to one another.

Therefore, the plurality of contacts 50 are disposed parallel to one another. Each of the plurality of contacts 50 is fixed and supported inside the groove 25 in a cantilever fashion such that a contact point 51 thereof can contact an external contact point of the IC card 80 which is inserted into the card receiving space 5. Each contact point 51 of the contact 50 is elastically deformable in a vertical direction and is thereby capable of electrically contacting the external contact point of the IC card 80 to be inserted at a predetermined contact pressure. Each of the plurality of contacts 50 is also supported inside the elongated groove 25 such that a terminal portion 53 connected by soldering to an external contact point 91 (see FIG. 9) of the printed board 90 passes through the front wall 24 of the base member 20 and protrudes forward. Here, the fixation of each of the plurality of contacts 50 to the base member 20 is not limited only to the above-described configuration in which the elongated grooves are provided.

A window portion 26 serving as a rectangular cutoff portion is provided at a central portion of the bottom wall 21 of the base member 20. The rectangular window portion 26 is formed so as to penetrate the bottom wall 21. Heat dissipating pieces 31, 32, and 33 constituting a heat dissipating mechanism 30 to be described later 30 are disposed in the window portion 26.

A pair of guide rails (only a guide rail 23a on a right side is shown in FIG. 1) for guiding the IC card 80 when inserting and pulling out the IC card 80 are formed inside the respective right and left side walls 22 and 23, at the inner corner portions intersecting with the bottom wall 21. The guide rails extend in the anteroposterior direction or the card insertion direction.

In this example, a write protect switch 60 for detecting a position of a write protect button (not shown) of the IC card 80 to be loaded and a card recognition switch 70 for detecting complete insertion of the IC card 80 into the card receiving space 5 of the card connector 1 are provided on the left side wall 22. Moreover, although not provided in this example, it is also possible to provide an ejection mechanism such as a conventional well-known push-push ejection mechanism for facilitating insertion and ejection of the IC card 80 along the right side wall 23, for example. If the ejection mechanism is provided, the heat dissipating mechanism 30 can also be used as a brake piece for preventing fall-out when ejecting the card.

Next, the heat dissipating mechanism 30 characterizing the present invention will be described. As described previously, the heat dissipating mechanism 30 is disposed in the window portion 26 formed on the base member 20. The heat dissipating mechanism 30 is integrally formed of a heat conductive metal thin plate by press work. In this example the heat dissipating mechanism 30 includes, without limitation, the plurality of heat dissipating pieces 31, 32, and 33 and a coupling piece 34 configured to couple an end of each of these heat dissipating pieces 31, 32, and 33 with one another and thereby to integrate the plurality of heat dissipating pieces 31, 32, and 33. The coupling piece 34 is the elongated and flat plate member that extends in a right-to-left direction or an orthogonal direction to the card insertion direction. The coupling piece 34 may be formed separately from the heat dissipating pieces 31, 32, and 33 or may be integrally formed as in this example. Alternatively, it is also possible to omit the coupling piece 34.

The heat dissipating pieces 31, 32, and 33 have the same strip shape when viewed from above, extend in the anteroposterior direction or the card insertion direction, and are disposed parallel to one another. The shape of the heat dissipating pieces 31, 32, and 33 will be explained by use of the heat dissipating piece 31 as an example. As shown in FIG. 2A, the heat dissipating piece 31 includes a front heat dissipating piece 31a, a bent portion 31b, and a rear heat dissipating piece 31c, and is formed into an angle shape protruding upward in terms of a cross section. By forming the angle shape as described above, the heat dissipating piece 31 is elastically deformable so as to be flattened when the IC card 80 is inserted into the card insertion space 5.

A front end portion 31d of the front heat dissipating piece 31a of the heat dissipating piece 31 is a member configured to contact a heat dissipating pad 92 provided on the printed bard 90 when inserting the IC card 80 into the card receiving space 5, and is formed as a free end. As shown in FIG. 2B, the front end portion 31d of the front heat dissipating piece 31a is preferably rolled back to form an arc shape protruding downward. By forming the front end portion 31d into the roll-back structure as described above, the front end portion 31d can smoothly contact the heat dissipating pad 92 provided on the printed board 90. Meanwhile, it is also possible to further provide a flat portion in the front end portion 31d in order to increase a contact area with the heat dissipating pad 92 provided on the printed board 90 to improve a heat dissipation effect.

The bent portion 31b of the heat dissipating piece 31 is formed substantially at a central part in the anteroposterior direction of the heat dissipating piece 31 and to extend orthogonally to the card insertion direction. As shown in FIG. 2A, the bent portion 31b is formed so as to protrude upward from an upper surface of the bottom wall 21 into the card receiving space 5 when the IC card 80 is not inserted into the card receiving space 5. The shape of the bent portion 31b in this example is formed by bending so as to protrude upward while defining an obtuse angle to establish a line contact with the IC card 80 to be inserted. However, the shape is not limited only to the foregoing. The bent portion 31b may be bent upward so as to be curved into an arc shape or may be bent so as to define a flat portion as shown in Example 2 to be described later in order to increase the contact area with the IC card 80 to improve the heat dissipation effect.

The rear heat dissipating piece 31c of the heat dissipating piece 31 has substantially the same length as the front heat dissipating piece 31a and a rear end portion thereof is coupled with the coupling piece 34. In this example, the plurality of heat dissipating pieces 31, 32, and 33 are fixed to the upper surface of the bottom wall 21 of the base member 20 via the coupling piece 34 by heat sealing. While the coupling piece 34 functions as a fixing member to the bottom wall 21, the coupling piece 34 also functions as a heat dissipating member to transfer the heat to the bottom wall 21. When the coupling piece 34 is omitted, the multiple heat dissipating pieces 31, 32, and 33 are individually fixed to the bottom wall 21. In this case, it is preferable to provide a flat extension piece at the back of the rear heat dissipating piece 31 of the heat dissipating piece 31 as a fixing member for the heat dissipating piece 31.

Note that the fixation of the multiple heat dissipating pieces 31, 32, and 33 to the bottom wall 21 of the base member 20 is not limited only to the above-described mode. For example, the heat dissipating piece 31 may be fixed to a lower surface of the bottom wall 21 of the base member 20 via the coupling piece 34 if such a configuration is acceptable in terms of design. Meanwhile, it is possible to fix the heat dissipating pieces by insert molding so as to be buried into the bottom wall 21 via the coupling piece 34 as shown in FIG. 4A, or it is also possible to form a slit on the bottom wall 21 and to press-fit and fix the heat dissipating pieces to the bottom wall 21 via the slit as shown in FIG. 4B.

As described above, the heat dissipating mechanism 30 is formed of the plurality of heat dissipating pieces 31, 32, and 33 and is therefore more flexible than the case of being formed as a single heat dissipating piece. Accordingly, it is possible to reduce a force necessary for inserting the card and to achieve smooth attaching and detaching operations of the card. Moreover, if the card is warped, the heat dissipating pieces 31, 32, and 33 each can evenly contact the card and dissipate the heat reliably. Hence there is not a risk of degrading heat dissipation efficiency.

As described previously, the plurality of contacts 50 are the members configured to connect the inserted IC card 80 electrically to the printed board 90 and are disposed parallel to one another on the front side of the bottom wall 21 of the base member 20. As shown in FIG. 2A, each of the contacts 50 includes the contact point 51 which contacts the external contact point (not shown) of the IC card 80, and the terminal portion 53 which contacts the external contact point 91 of the printed board 90. Moreover, the contacts 50 are respectively supported in the cantilever fashion inside the elongated grooves 25 provided on the bottom wall 21 of the base member 20 so that the contact portion 51 can elastically contact the external contact point of the IC card 80. Therefore, the contact point 51 of each contact 50 is supported by the base member 20 so as to protrude into the card receiving space 5.

The card connector 1 as Example 1 of the present invention has been described above. Now, an operation of the card connector will be described below by using FIGS. 2A and 2B as well as FIGS. 3A and 3B, focusing particularly on the heat dissipating piece 31 constituting the heat dissipating mechanism 30.

FIG. 2A shows a state where the IC card 80 is not inserted into the card receiving space 5. At this time, the bent portion 31b of the heat dissipating piece 31 of the heat dissipating mechanism 30, one end of which is fixed to the bottom wall 21 of the member 20 via the coupling piece 34, protrudes from the upper surface of the bottom wall 21 of the base member 20 into the card receiving space 5 located thereabove. In this example, as shown in FIG. 2B, the front end portion 31d being the free end of the heat dissipating piece 31 is disposed above and apart from the printed board 90. However, the layout of the front end portion 31d is not limited only to the foregoing and the front end portion 31d may also be disposed so as to contact (the heat dissipating pad 92 of) the printed board 90. Meanwhile, the contact portion 51 of the contact 50 also protrudes from the groove 25 into the card receiving space 5 located thereabove.

In the state shown in FIG. 2A, when the IC card 80 is inserted from the card insertion slot 6, the bent portion 31b of the heat dissipating piece 31 of the heat dissipating mechanism 30 contacts either a tip end surface 81 or a step portion 83 of the IC card 80. Accordingly, the front end portion 31d of the heat dissipating piece 31 is pushed downward and thereby contacts the upper surface of the printed board 90.

When the IC card 80 is further inserted and the tip end surface 81 of the IC card 80 reaches a rear surface of the front wall 24 of the base member 20, the bent portion 31b of the heat dissipating piece 31 contacts a bottom surface 82 of the IC card 80. Therefore, as shown in FIG. 3A, the heat dissipating piece 31 which is formed into the angle shape protruding upward extends inside the window portion 26 of the bottom wall 21 in the flattened fashion. At this time, the front end portion 31d of the heat dissipating piece 31 contacts the heat dissipating pad 92 provided on the printed board 90 (see FIG. 3B). Here, it is needless to say that the length of the front end portion 31d in the anteroposterior direction of the heat dissipating piece 31 is adjusted properly so as not to touch the window portion 26 of the bottom wall 21.

In the state shown in FIG. 3A, signals are transmitted and received between the IC card 80 and the printed board 90. Here, the heat accumulated on the IC card 80 flows toward the printed board 90 having a large heat capacity via the respective front end portions of the multiple heat dissipating pieces 31, 32, and 33 as well as the coupling piece 34 which constitute the heat dissipating mechanism 30.

Meanwhile, in the state shown in FIG. 3A, the plurality of heat dissipating pieces 31, 32, and 33 are elastically deformed into the flattened shape, whereby the IC card 80 is pressed against the top board 11 of the cover member 10 by resilience thereof. Accordingly, the position in the vertical direction of the IC card 80 is fixed. Hence it is expected to obtain predetermined contact pressures with the multiple contacts 50. Moreover, it is also expected to achieve heat dissipation via the metallic cover member 10.

EXAMPLE 2

Figure 5:
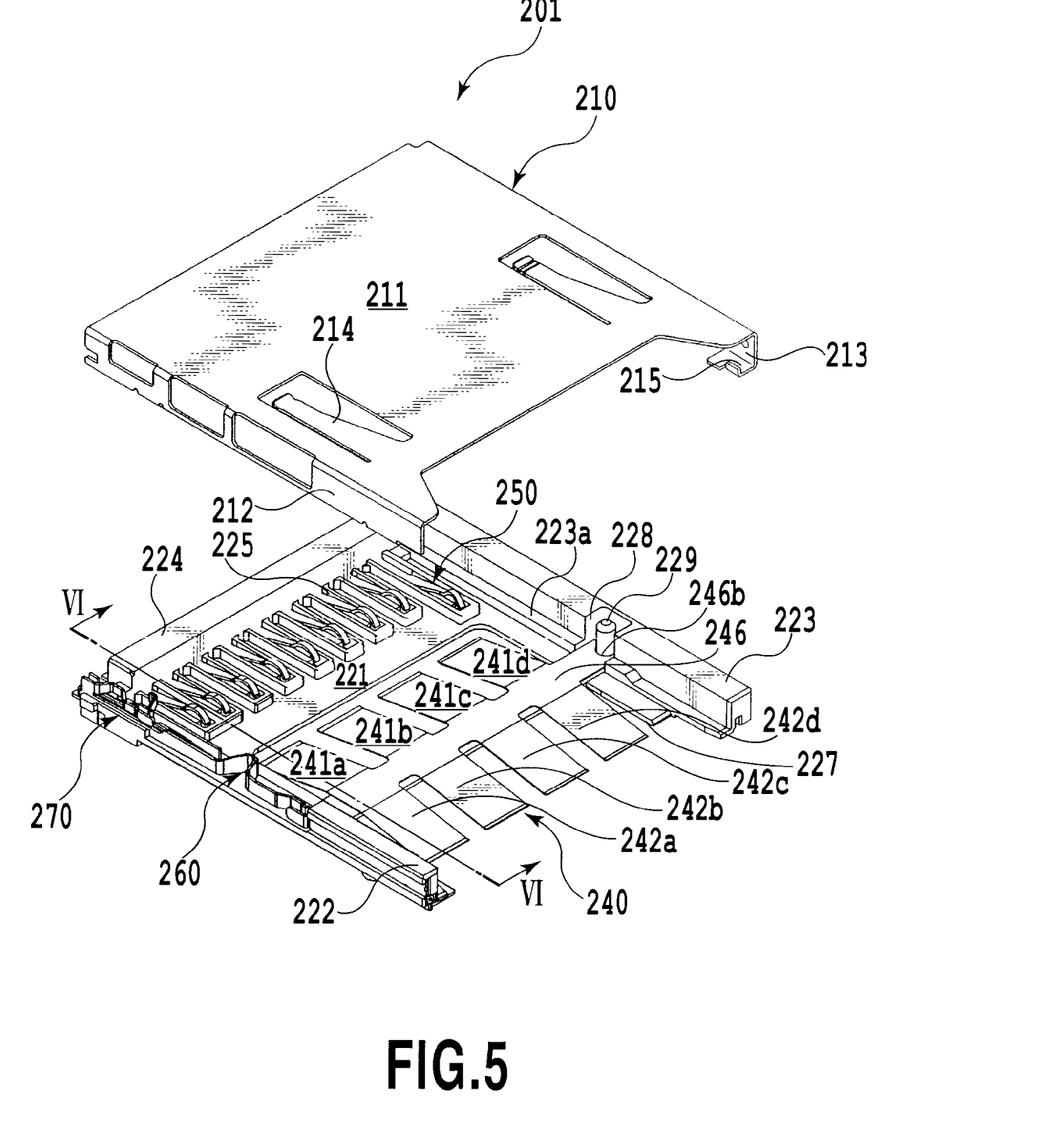
FIG. 5 is an assembly exploded perspective view of a card connector for small card according to Example 2 of the present invention.
Figure 6A:
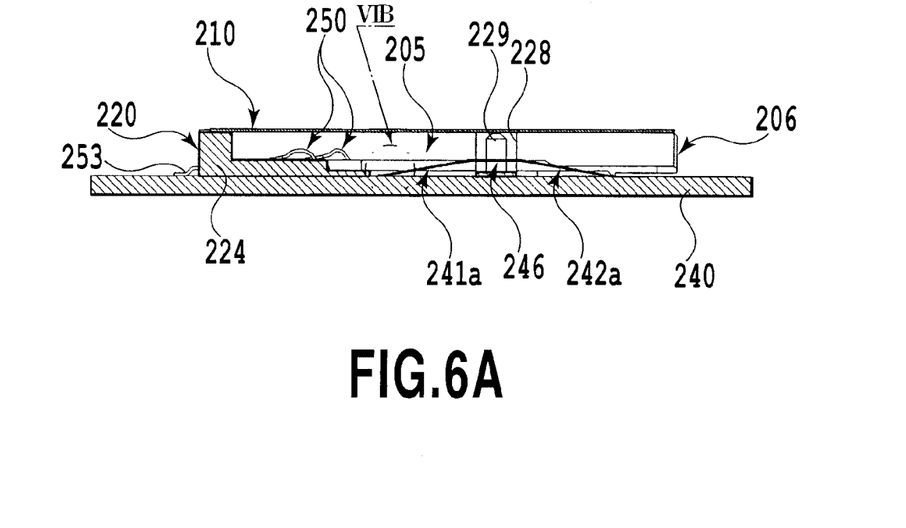
FIG. 6A is a schematic cross-sectional view of the card connector for small card of FIG. 5 being fitted onto a printed board of an electronic device or the like, which is taken along a VI-VI line and shows a state where an IC card is not inserted.
Figure 6B:
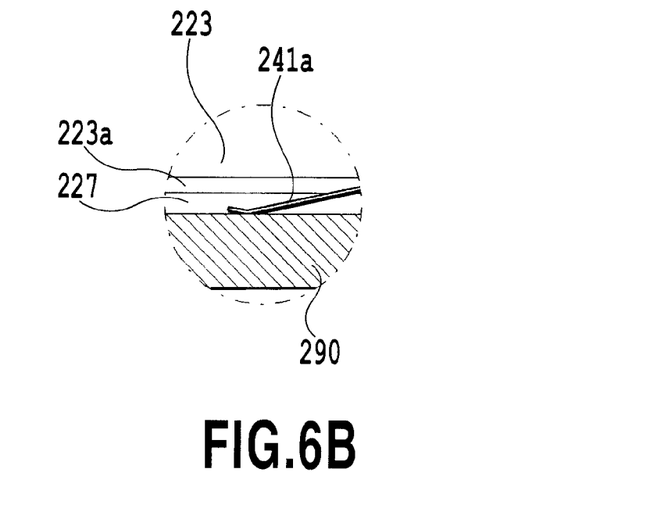
FIG. 6B is a partially enlarged cross-sectional view of a portion VIB in FIG. 6A.
Figure 7A:
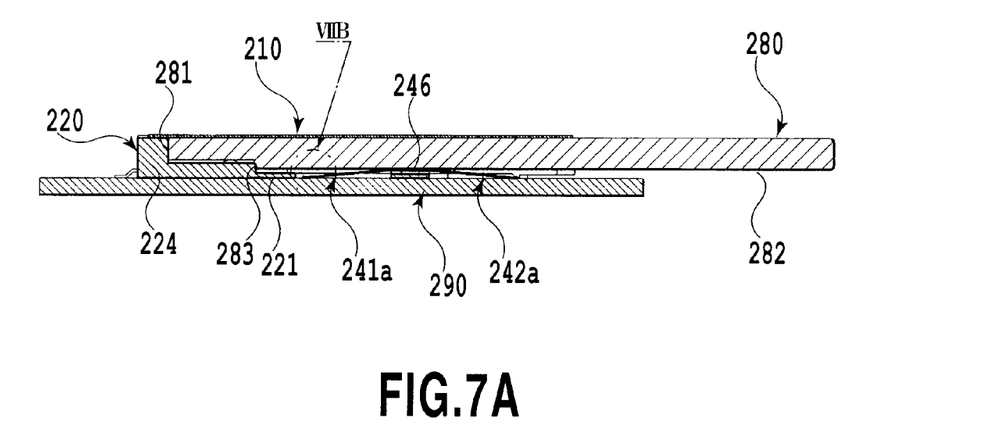
FIG. 7A is a schematic cross-sectional view of the card connector for small card of FIG. 5 as similar to FIG. 6A, which shows a state where the IC card is inserted.
Figure 7B:
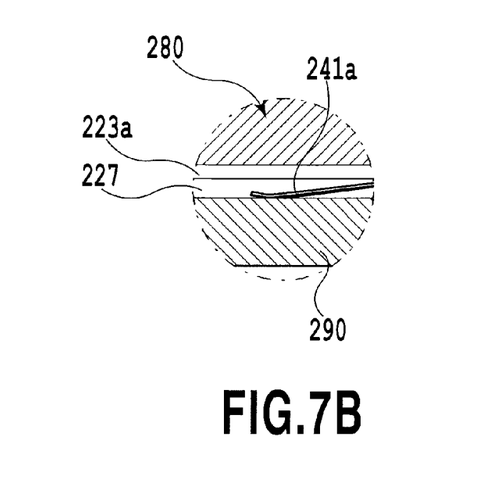
FIG. 7B is a partially enlarged cross-sectional view of a portion VIIB in FIG. 7A.
Figure 8A:
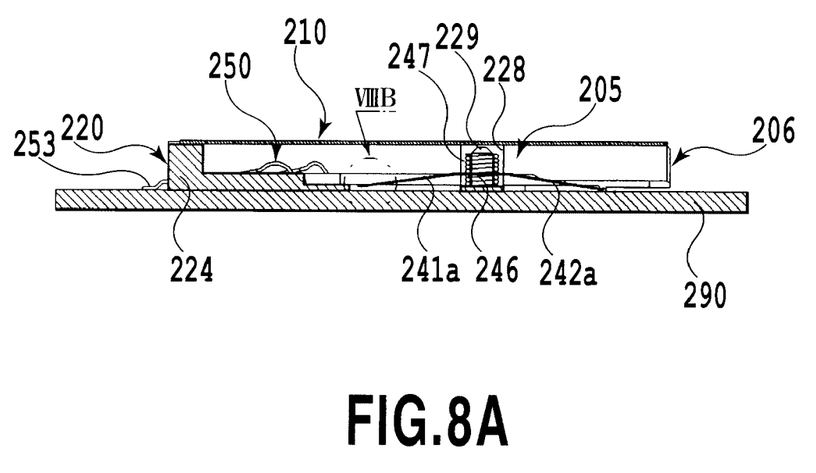
FIG. 8A is a schematic cross-sectional view of a modified example of the card connector for small card according to Example 2 of the present invention, which shows the connector in a state where a cover member is detached therefrom, the card connector for small card being fitted onto a printed board of an electronic device.
Figure 8B:
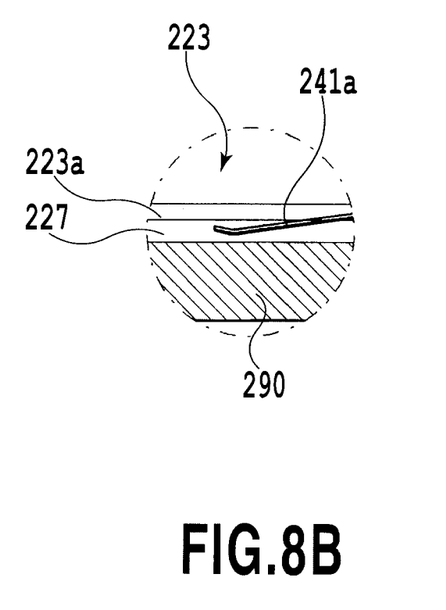
FIG. 8B is a partially enlarged cross-sectional view of a portion VIIIB in FIG. 8A.

FIG. 5 is an exploded perspective view of a card connector for small card according to Example 2 of the present invention. FIG. 6A is a schematic cross-sectional view of the card connector for small card of FIG. 5 being fitted onto a printed board of an electronic device, which is taken along a VI-VI line and shows a state where an IC card is not inserted. FIG. 6B is a partially enlarged cross-sectional view of FIG. 6A. FIG. 7A is a schematic cross-sectional view of the card connector for small card of FIG. 5 as similar to FIG. 7A, which shows a state where the IC card is inserted. FIG. 7B is a partially enlarged cross-sectional view of FIG. 7A as similar to FIG. 6B. FIG. 8A is a schematic cross-sectional view of a modified example of the card connector according to Example 2 of the present invention, which shows the card connector fitted onto a printed board of an electronic device in a state where an IC card is not inserted. FIG. 8B is a partially enlarged cross-sectional view of FIG. 8A.

The card connector according to Example 2 of the present invention is shown in FIG. 5 to FIG. 7B. In comparison with the connector 1 according to Example 1, this connector 201 of this example basically has a different structure of a heat dissipating mechanism 240 and thereby a structure of a base member 220 is only slightly different from Example 1. Therefore, reference numerals for the same members as those in the connector 1 of Example 1 will be simply indicated by adding 200 and explanation thereof will be omitted.

The base member 220 will be described to begin with. A bottom wall 221 of the base member 220 is provided with a rectangular cutoff portion 227 of which a rear part is opened. A plurality of heat dissipating pieces constituting the heat dissipating mechanism 240 are disposed at the rectangular cutoff portion 227. Meanwhile, on right and left side walls 222 and 223 of the base member 220, a pair of housing recess portions (only the housing recess portion formed on the right side wall 223 is illustrated in FIG. 5) 228 are provided in predetermined positions so as to face each other. The housing recess portions 228 each open upward and inward (toward a card receiving space 205) and are formed to allow both of right and left ends of a support member 246 constituting the heat dissipating mechanism 240 to be housed therein, respectively. Bottom surfaces of the housing recess portions 228 and an upper surface of the bottom wall 221 of the base member 220 are formed on the same plane. Each of the pair of housing recess portions 228, 228 is provided with a columnar post 229 (only one on the right side wall 223 side is illustrated in FIG. 5) vertically upstanding from the bottom surface of the housing recess portion 228. The pair of columnar posts 229, 229 are respectively provided outside right and left guide rails of the base member 220 (on the opposite side of the card receiving space 205). Here, the shape of the posts 229 is defined as the columnar shape in this example. However, the shape is not limited only to the foregoing.

Next, the heat dissipating mechanism 240 according to Example 2 will be described. As shown in FIG. 5 and FIG. 6A, the heat dissipating mechanism 240 of this example includes a plurality of heat dissipating pieces, and the flat support member 246 configured to couple the heat dissipating pieces to one another so as to be held by the base member 200.

The support member 246 is the flat platy member extending in the right-to-left direction, and both of right and left ends thereof extend beyond the pair of posts 229 which are respectively provided on the right and left side walls 222 and 223 of the base member 220 to be described later. On both of right and left end portions of the support member 246, provided are through holes (only a through hole 246b formed at the right end portion is illustrated in FIG. 5) having a slightly larger inner diameter than a diameter of the columnar posts 229. As the columnar posts 229 are inserted to the respective through holes, the support member 246 is supported vertically movably by the base member 220 via the posts 229. Moreover, as shown in FIG. 6A, the support member 246 is disposed so as to be located inside the card receiving space 205 when an IC card 280 is not inserted thereto.

In this example, eight heat dissipating pieces are provided in total, namely, four each in front and back of the support member 246. To be more precise, front heat dissipating pieces 241a, 241b, 241c, and 241d are coupled with a front part of the support member 246 while rear dissipating pieces 242a, 242b, 242c, and 242d are coupled with a rear part of the support member 246. As similar to the heat dissipating mechanism 30 of Example 1, the plurality of heat dissipating pieces 241a to 241d and 242a to 242d constituting the heat dissipating mechanism 240 may be integrally formed by press work using a heat conductive metal thin plate, or alternatively, the plurality of heat dissipating pieces and the support member 246 may be respectively formed as separate members and then integrated together as the heat dissipating mechanism 240.

The plurality of heat dissipating pieces, or namely, the front heat dissipating pieces 241a to 241d and the rear heat dissipating pieces 242a to 242d in this example, have the same shape when viewed from above and extend parallel to one another in the anteroposterior direction from the support member 246.

In this example, as shown in FIG. 6A, the front heat dissipating pieces 241a to 241d are each bent so as to be inclined from a front end of the support member 246 forward and downward. Similarly, the rear heat dissipating pieces 242a to 242d are each also bent so as to be inclined from a rear end of the support member 246 backward and downward. Each of free ends of the plurality of front heat dissipating pieces 241a to 241d and the plurality of rear heat dissipating pieces 242a to 242d is preferably formed into a roll-back structure configured to protrude downward as similar to the front end portion 41d of the heat dissipating piece 31 in Example 1 (see FIG. 6B).

As shown in FIG. 6A the heat dissipating mechanism 240 of this example forms a cross section of a trapezoidal shape with the front heat dissipating pieces, the flat support member, and the rear heat dissipating pieces. By forming the heat dissipating mechanism as described above, the support member 246 constituting the heat dissipating mechanism 240 can elastically move up and down relative to the printed board 290 by way of the plurality of heat dissipating pieces 241a to 241d and 242a to 242d which are provided in front and back in the inclined manner. Moreover, as described previously, by designing the support member 246 so as to be disposed inside the card receiving space 205, the support member 246 is pushed out of the card receiving space 205 as the IC card 280 is inserted. In this way, the heat dissipating mechanism 240 in the trapezoidal shape is flattened as shown in FIG. 7A.

Next, concerning the card connector according to this example, an operation at the time of insertion of the IC card 280 will be briefly described.

In this example, as shown in FIG. 6A, the heat dissipating mechanism 240 forms the trapezoidal shape when the IC card 280 is not inserted, and the support member 246 constituting the heat dissipating mechanism 240 is disposed inside the card receiving space 205. Meanwhile, the respective free ends of the plurality of heat dissipating pieces 241a to 241d and 242a to 242d, which constitute the heat dissipating mechanism 240, contact the printed board 290 as shown in FIG. 6B.

In the state shown in FIG. 6A, when the IC card 280 is inserted from a card insertion slot 206 into the card receiving space 205, a lower surface of the IC card 280 contacts the flat support member 246 and pushes this down. As the IC card 280 is completely inserted into the card receiving space 205, the heat dissipating mechanism 240 becomes almost flat as shown in FIG. 7A and the respective free ends of the plurality of heat dissipating pieces 241a to 241d and 242a to 242d completely contact the heat dissipating pads (see FIG. 9) of the printed board 290. In this example as well, signals are transmitted and received at high speed between the IC card 280 and the printed board 290 in the state shown in FIG. 7A as similar to Example 1. At this time, the heat accumulated on the IC card 280 is dissipated by the action of the heat dissipating mechanism 2400 as similar to Example 1, whereby a rise in temperature of the IC card 280 is suppressed.

As described above, the heat dissipating mechanism 240 is formed of the plurality of heat dissipating pieces and therefore has flexibility as compared to the case of being formed as a single heat dissipating piece. Accordingly, it is possible to reduce a force necessary at the time of inserting the card and to achieve smooth attaching and detaching operations of the card. Moreover, even if the card is warped, the heat dissipating pieces each evenly contact the card and dissipate the heat reliably. Hence there is not a risk of degrading heat dissipation efficiency.

A modified example of the heat dissipating mechanism 240 of this example is shown in FIGS. 8A and 8B. In this modified example, the heat dissipating mechanism 240 is supported by way of coil springs 247. To be more precise, the respective coil springs 247 are integrally embedded in the pair of through holes formed on both end portions of the support member 246 constituting the heat dissipating mechanism 240. Then, the coil springs 247 embedded in the support member 246 are respectively fitted into the pair of posts 229 provided on the base member 220 as shown in FIG. 8A. An inside diameter of the coil spring 247 is set to be substantially equal to an inside diameter of the through hole, and to be slightly larger than an outside diameter of the columnar post 229.

By supporting the support member 246 by use of the coil springs 247 as described above, the heat dissipating mechanism 240 does not move toward the top board side of the cover member 210 when replacing the IC card 280. For example, even if the posture of the connector attached to the electronic device is inevitably inverted for a design reason, the heat dissipating mechanism 240 is avoided from falling into the top board side of the cover member 210 due to presence of the coil springs 247 when the IC card 280 is taken out of the connector. In this way, when the IC card 280 is inserted next time, the heat dissipating mechanism 240 does not hinder insertion of the IC card 280. Note that an operation of the card connector according to this modified example is substantially the same as Example 2 and description will therefore be omitted.

The invention claimed is:

1. A card connector in which a card receiving space for receiving at least a part of a small card incorporating an integrated circuit is formed by a cover member having at least a top board and right and left side walls and a base member having at least a bottom wall, a front wall, and right and left side walls, the card connector comprising:

a plurality of contacts passing through the front wall of the base member and being elastically deformably supported by the base member, each of the contacts electrically connecting an external contact point of a printed board on which the card connector is attached and an external contact point of the small card when the small card is inserted into the card receiving space; and a heat dissipating mechanism located behind the plurality of contacts and elastically deformably supported by the base member; wherein the heat dissipating mechanism includes at least one heat dissipating piece having a free end at one end;

the heat dissipating mechanism is disposed at a cutoff portion formed at the bottom wall of the base member such that at least the free end of the heat dissipating piece contacts the printed board when the small card is inserted into the card receiving space;

the heat dissipating mechanism includes the at least one heat dissipating piece extending in an anteroposterior direction and having a front heat dissipating piece having a free end at a front end portion, a bent portion continuous with the front heat dissipating piece, and a rear heat dissipating piece continuous with the bent portion and having a rear end portion supported by the base member;

the heat dissipating mechanism has a cross section of an angle shape protruding upward; and the bent portion of the heat dissipating piece is disposed inside the card receiving space when the small card is not inserted.

2. The card connector according to claim 1, wherein the heat dissipating mechanism further includes an elongated and flat coupling portion being coupled with the rear end portion of the rear heat dissipating piece and extending in a right-to-left direction; and the heat dissipating mechanism is supported by the base member via the coupling portion.

3. A card connector in which a card receiving space for receiving at least a part of a small card incorporating an integrated circuit is formed by a cover member having at least a top board and right and left side walls and a base member having at least a bottom wall, a front wall, and right and left side walls, the card connector comprising:

a plurality of contacts passing through the front wall of the base member and being elastically deformably supported by the base member, each of the contacts electrically connecting an external contact point of a printed board on which the card connector is attached and an external contact point of the small card when the small card is inserted into the card receiving space; and a heat dissipating mechanism located behind the plurality of contacts and elastically deformably supported by the base member; wherein the heat dissipating mechanism includes at least one heat dissipating piece having a free end at one end;

the heat dissipating mechanism is disposed at a cutoff portion formed at the bottom wall of the base member such that at least the free end of the heat dissipating piece contacts the printed board when the small card is inserted into the card receiving space;

the heat dissipating mechanism includes an elongated and flat support member extending in a right-to-left direction, a front heat dissipating piece extending in an anteroposterior direction and having a free end at one end and another end coupled with the support member, and a rear heat dissipating piece extending in the anteroposterior direction and having a free end at one end and another end coupled with the support member;

the heat dissipating mechanism has a cross section of a trapezoidal shape and is vertically movably supported at both end portions of the support member by the base member; and the support member is disposed inside the card receiving space when the small card is not inserted.

4. The card connector according to claim 3, wherein a through hole is formed on each of right and left end portions of the support member; and the heat dissipating mechanism is vertically movably supported by inserting posts formed upstanding at the right and left side walls of the base member into the through holes of the support member.

5. The card connector according to claim 4, wherein the support member further comprises a coil spring; and the coil spring is fitted into each of the through holes for the posts.

* * * * *